US012452697B2

(12) United States Patent
Nakamura

(10) Patent No.: US 12,452,697 B2
(45) Date of Patent: Oct. 21, 2025

(54) INFORMATION PROCESSING DEVICE AND INFORMATION PROCESSING METHOD

(71) Applicants: Nissan Motor Co., Ltd., Yokohama (JP); RENAULT S.A.S., Boulogne-Billancourt (FR)

(72) Inventor: Mitsunori Nakamura, Kanagawa (JP)

(73) Assignees: Nissan Motor Co., Ltd., Yokohama (JP); RENAULT S.A.S., Boulogne-Billancourt (FR)

( * ) Notice: Subject to any disclaimer, the term of this patent is extended or adjusted under 35 U.S.C. 154(b) by 295 days.

(21) Appl. No.: 18/547,891

(22) PCT Filed: Mar. 10, 2021

(86) PCT No.: PCT/IB2021/000176
§ 371 (c)(1),
(2) Date: Aug. 25, 2023

(87) PCT Pub. No.: WO2022/189822
PCT Pub. Date: Sep. 15, 2022

(65) Prior Publication Data
US 2024/0155373 A1 May 9, 2024

(51) Int. Cl.
*H04W 16/28* (2009.01)
*H04W 4/46* (2018.01)
(52) U.S. Cl.
CPC ............ *H04W 16/28* (2013.01); *H04W 4/46* (2018.02)
(58) Field of Classification Search
CPC ................................ H04W 16/28; H04W 4/46
(Continued)

(56) References Cited

U.S. PATENT DOCUMENTS 10,098,014 B1\* 10/2018 Shimizu .................. H04W 4/80
2004/0125041 A1\* 7/2004 Smith .................. H01Q 1/3275
343/895
(Continued)

FOREIGN PATENT DOCUMENTS

CN        110121160 B     7/2020
JP         2008-233017 A    10/2008
(Continued)

OTHER PUBLICATIONS

Extended European Search Report of Mar. 22, 2024 of corresponding European Patent Application No. 21929997.1.
(Continued)

*Primary Examiner* — April G Gonzales
(74) *Attorney, Agent, or Firm* — GLOBAL IP COUNSELORS, LLP

(57) ABSTRACT

An information processing device includes a communication unit and a controller. The communication unit performs data communication with another vehicle present in an area around a host vehicle. The controller controls the data communication performed by the communication unit. Based on an amount of transition in frequency due to a Doppler shift corresponding to a relative speed of the other vehicle in relation to the host vehicle, the controller extracts, from among a plurality of the other vehicles, a designated moving body with which the communication unit is to perform the data communication. The controller initiates the data communication with the designated moving body.

8 Claims, 6 Drawing Sheets

(58) Field of Classification Search
USPC .......................................................... 455/517
See application file for complete search history.

(56) References Cited

U.S. PATENT DOCUMENTS

| | | | |
|---|---|---|---|
| 2011/0013075 A1* | 1/2011 | Kim ...................... | H04N 7/147 |
| | | | 348/370 |
| 2013/0083679 A1* | 4/2013 | Krishnaswamy ...... | G08G 1/093 |
| | | | 370/252 |
| 2017/0244160 A1* | 8/2017 | Neubecker ........... | H01Q 1/3208 |
| 2018/0188746 A1* | 7/2018 | Lesher ................. | G05D 1/0217 |
| 2019/0164423 A1* | 5/2019 | Bai .................. | G08G 1/096791 |
| 2020/0037301 A1* | 1/2020 | Park .................. | H04W 72/0453 |
| 2021/0235285 A1* | 7/2021 | Guerena ............... | H04W 16/28 |
| 2021/0377706 A1* | 12/2021 | Lekutai .................. | H04W 4/06 |
| 2023/0367005 A1* | 11/2023 | Hwang .................. | G01S 13/58 |

FOREIGN PATENT DOCUMENTS

| | | |
|---|---|---|
| JP | 2016-143325 A | 8/2016 |
| JP | 2018-67880 A | 4/2018 |
| WO | 2015/190056 A1 | 12/2015 |
| WO | 2020/008911 A1 | 1/2020 |
| WO | 2020/022399 A1 | 1/2020 |

OTHER PUBLICATIONS

Office Action of Feb. 21, 2025 of corresponding Korean Patent Application No. 10-2023-7032155.

\* cited by examiner

INFORMATION PROCESSING DEVICE AND INFORMATION PROCESSING METHOD

CROSS-REFERENCE TO RELATED APPLICATIONS

This application is a U.S. national stage application of International Application No. PCT/IB2021/000176, filed on Mar. 10, 2021.

BACKGROUND

Technical Field

The present invention relates to an information processing device and an information processing method.

Background Information

Japanese Laid-Open Patent Application No. 2018-67880 (Patent Document 1) discloses a communication device comprising a communication unit that performs vehicle-to-vehicle communication with a plurality of other vehicles present around a host vehicle via an antenna unit. The communication device furthermore comprises an acquisition unit for acquiring information relating to the plurality of other vehicles, and a control unit for controlling at least one of gain and directivity direction of the antenna unit based on the information acquired by the acquisition unit.

SUMMARY

A technique disclosed in Patent Document 1 involves controlling a directivity of an antenna unit with respect to other vehicles detected by a radar device. Therefore, in a scenario in which numerous other vehicles are present around the host vehicle, communication can only be performed with other vehicles present in the vicinity of the host vehicle, and thus there is a possibility that the host vehicle will be unable to communicate with another vehicle requiring attention by the host vehicle. As a result, the host vehicle may not be able to suitably accept necessary information.

The present invention was contrived in view of the foregoing problem, it being an object of the present invention to provide an information processing device and an information processing method with which it is possible to suitably accept necessary information.

An information processing device according to one aspect of the present invention is provided with a communication unit that performs data communication with a second moving body present in an area around a first moving body, and a controller that controls the data communication. Based on an amount of transition in frequency due to a Doppler shift that corresponds to a relative speed, the controller extracts a designated moving body from among second moving bodies, and initiates data communication with the designated moving body.

The present invention makes it possible to suitably accept necessary information.

BRIEF DESCRIPTION OF THE DRAWINGS

Referring now to the attached drawings which form a part of this original disclosure.

DETAILED DESCRIPTION OF EMBODIMENTS

Figure 1:
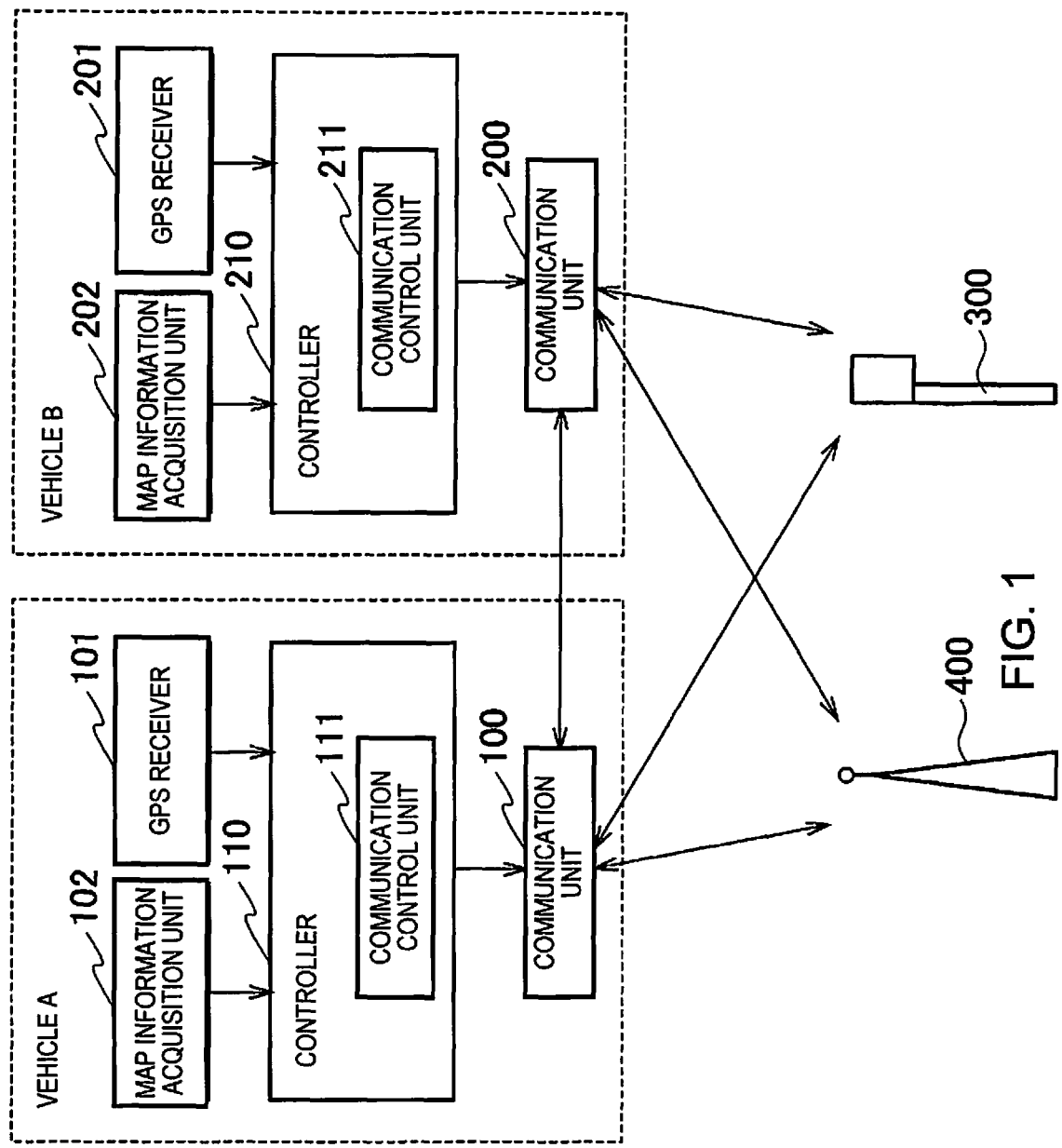
FIG. 1 is a block diagram showing a communication network according to the present embodiment.

A preferred embodiment of the present invention is described below with reference to the accompanying drawings. Identical configurations appearing in the drawings are assigned identical reference symbols and are not redundantly described.

A communication network according to the present embodiment shall be described with reference to FIG. 1. The communication network according to the present embodiment is provided with a vehicle A and a vehicle B. The vehicle A and the vehicle B are examples of moving bodies (first moving body and second moving body). The vehicle A is a host vehicle, and the vehicle B is another vehicle present around the host vehicle. In FIG. 1, only a single vehicle B is depicted, but there can be a plurality of vehicles B.

The vehicle A and the vehicle B can have autonomous driving functions, but also can lack autonomous driving functions. Additionally, the vehicle A and the vehicle B can be capable of switching between autonomous driving and manual driving. In the present embodiment, the vehicle A and the vehicle B are described as vehicles having autonomous driving functions.

The communication network is furthermore provided with a roadside unit 300, a base station 400.

The vehicle A is provided with a communication unit 100 having a data communication function. The vehicle B is provided with a communication unit 200 having a data communication function. Each of the communication units 100, 200 is configured from, e.g., one or more antennas, a modem, an application processor, a memory, and the like.

The communication unit 100 and the communication unit 200 are capable of communicating directly with one another. Direct communication performed by the communication unit 100 and the communication unit 200 is defined below as direct communication. Direct communication can also be expressed as vehicle-to-vehicle communication. In the present embodiment, the vehicle A and the vehicle B are capable of sharing a plurality of items of data, such as information pertaining to the vehicles (vehicle A and vehicle B), through direct communication.

The communication unit 100 and the communication unit 200 can also communicate with each other via the base station 400 and a network (not shown; e.g., a mobile phone network). The base station 400 is a fixed communication device that does not move and is an access point that covers the network. Communication between the communication unit 100 and the communication unit 200 via the base station 400 and the network is defined as indirect communication, as opposed to direction communication.

Direct communication, due to not being performed via the base station 400 and the network, makes it possible to transmit data to a counterpart using a simple configuration having low delay. Indirect communication is used when transmitting high-volume data that cannot be sent by direction communication or data that is to be repeatedly sent without there being any change in given-time information. Indirect communication can also be used in cases in which direct communication is impossible.

Each of the communication units 100, 200 can communicate with the roadside unit 300. The roadside unit 300 is a fixed communication device that can be installed, for example, on a road facility at a road shoulder, the roadside unit 300 distributing distribution data including prescribed information to vehicles on a road. The roadside unit 300 (RSU) can also be referred to as an intelligent transport systems (ITS) spot.

The roadside unit 300 indicated in the present embodiment corresponds to a transmitting station, and the communication units 100, 200 correspond to receiving stations. The roadside unit 300 and the communication units 100, 200 perform downlink communication from the roadside unit 300 to the communication units 100, 200. However, the roadside unit 300 and the communication units 100, 200 are capable of performing uplink communication in a reverse direction. In such a case, the communication units 100, 200 correspond to transmitting stations, and the roadside station 300 corresponds to a receiving station. Communication between the communication units 100, 200 and the roadside unit 300 is also referred to as road-to-vehicle communication.

The distribution data that is distributed from the roadside unit 300 includes roadside-unit data indicating information pertaining to the roadside unit 300, and traffic data indicating information pertaining to vehicles present around the roadside unit 300. The information pertaining to the roadside unit 300 includes, inter alia, position information pertaining to the roadside unit 300. The information pertaining to vehicles includes, inter alia, position information, speed information, and advancement-direction information pertaining to the vehicles.

A configuration of the vehicle A shall be described next.

The vehicle A is provided with the communication unit 100 described above, a GPS receiver 101, a map information acquisition unit 102, and a controller 110. The communication unit 100, GPS receiver 101, map information acquisition unit 102, and controller 110 constitute an information processing device for realizing the vehicle-to-vehicle communication indicated in the present embodiment.

The GPS receiver 101 receives radio waves from an artificial satellite, thereby detecting position information pertaining to the vehicle A on a surface of Earth. The position information pertaining to the vehicle A detected by the GPS receiver 101 includes latitude information, longitude information, and time information. The GPS receiver 101 outputs the detected position information pertaining to the vehicle A to the controller 110. A method by which the position information pertaining to the vehicle A is detected is not limited to involving the GPS receiver 101. For example, the position can be estimated using a method known as odometry. Odometry is a method for deriving an amount of movement of the vehicle A and a movement direction thereof in accordance with a turning angle and a turning-angle speed of the vehicle A, whereby the position of the vehicle A is estimated. A global positioning system (GPS) is part of a global navigation satellite system (GNSS).

The map information acquisition unit 102 acquires map information indicating a structure of the road on which the vehicle A is traveling. The map information acquisition unit 102 can possess a map database in which the map information is stored or can acquire the map information from an external map data server through cloud computing. The map information acquisition unit 102 can also acquire the map information using vehicle-to-vehicle communication or road-to-vehicle communication.

The map information includes: node information, including a type of node, a position of the node, or other information indicating an intersection, junction, or the like; and link information, including a type, link length, lane count, curvature, slope, or other features of a link that is a road segment linking nodes. The link information also includes information pertaining to road structure, such as absolute positions of lanes and relationships pertaining to connection of the lanes. The map information furthermore includes information pertaining to traffic regulations, road signs, and the like.

The controller 110 is configured from, e.g., a microcomputer. The controller 110 has, e.g., a central processing unit (CPU) or other hardware processor, a memory, and a variety of interfaces. The memory and the variety of interfaces are connected to the hardware processor via a bus.

A computer program for causing the microcomputer to function as an information processing device is installed in the microcomputer. Due to execution of the computer program, the microcomputer functions as a plurality of information processing circuits provided to the information processing device. The controller 110 is provided with a communication control unit 111, as one example of the plurality of information processing circuits.

The communication control unit 111 controls wireless communication (data communication) performed by the communication unit 100.

The communication control unit 111 performs such actions as switching an operating mode of the communication unit 100 and controlling a beam formed by the communication unit 100. The communication unit 100 has, as operating modes that can be switched between, a normal mode and a directivity mode. The operating modes of the communication unit 100 shall be described with reference to FIGS. 2A and 2B.

Figure 2A:
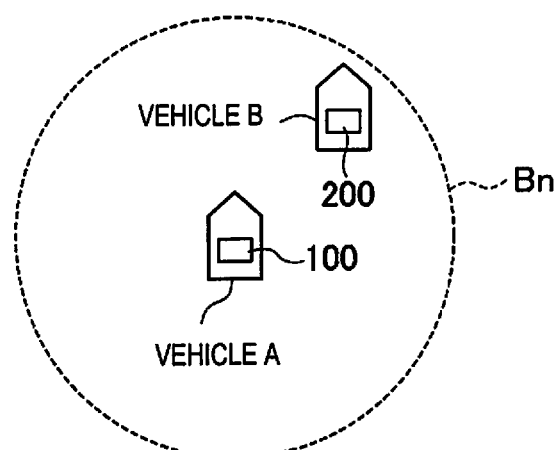
FIG. 2A is a diagram illustrating a normal mode of a communication unit.

The normal mode shall be described with reference to FIG. 2A. In the normal mode, wireless communication is performed for a preset range (area) without directivity related to wireless communication of the communication unit 100 being controlled. When operating in the normal mode, the communication unit 100, or more specifically the antenna of the communication unit 100, forms a normal beam Bn for a prescribed range (area). The normal beam Bn is, for example, formed uniformly at every bearing, and does not have directivity with respect to a specific bearing. The normal beam Bn is formed in a circular range that is centered on the communication unit 100 and has a prescribed distance as a radius. Thus, the prescribed range in which the normal beam Bn is formed can be a circular range that has the prescribed distance as a radius or, as another example, can be a prescribed range having directivity in a prescribed direction, such as a vehicle advancement direction. Thus, in the normal mode, the normal beam Bn is formed for the preset prescribed range by the antenna of the communication unit 100.

The vehicle A can communicate with a vehicle B present within the area in which the normal beam Bn is formed. The area in which it is possible to communicate with a communication unit 100 operating in the normal mode is referred to as a normal communication area. The normal communication area basically corresponds to the area in which the normal beam Bn is formed. However, even in the area in which the normal beam Bn is formed, it might be impossible to communicate with the vehicle B at a communication quality equal to or higher than a given level due to effects of dampening of radio waves or effects of a communication environment in which an obstruction is present. Specifically, the normal communication area refers to an area in which it is possible to communicate with the vehicle B at a communication quality equal to or higher than a given level and does not necessarily coincide with the area (prescribed range) in which the normal beam Bn is formed.

Figure 2B:
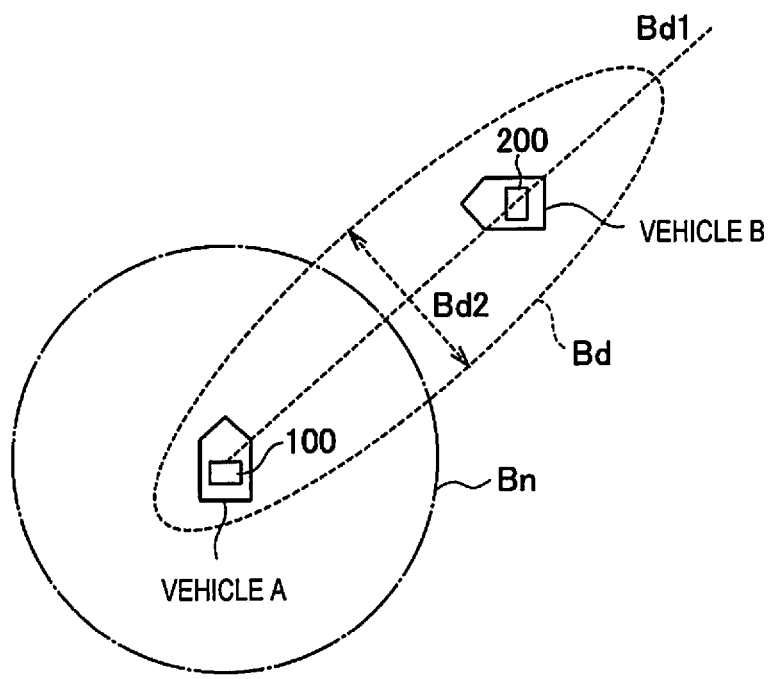
FIG. 2B is a diagram illustrating a directivity mode of the communication unit.

The directivity mode is described with reference to FIG. 2B. The directivity mode is a mode in which directivity relating to wireless communication performed by the communication unit 100 can be controlled. In the present description, the directivity related to wireless communication is referred to below simply as "directivity." When operating in the directivity mode, the antenna of the communication unit 100 forms a directional beam Bd. The directional beam Bd is formed toward a specific bearing and has directivity with respect to the specific bearing. The bearing corresponds to a horizontal component of a direction. The directional beam Bd is formed as a beam having a prescribed beam width Bd2 centered on a beam axis Bd1 having a prescribed azimuth. The azimuth of the beam axis Bd1 and the beam width Bd2 can be individually adjusted, thereby making it possible to adjust the directivity of the communication unit 100. Thus, the directional mode corresponds to an operating mode in which the antenna of the communication unit 100 has directivity.

The vehicle A can communicate with the vehicle B present in the area in which the directional beam Bd is formed. The directional beam Bd is formed to be long in a direction following the beam axis Bd1, a distance in said direction (axial-direction distance) being greater than a radial distance of the normal beam Bn. Additionally, a reception strength in communication using the directional beam Bd is relatively higher than a reception strength in communication using the normal beam Bn when it is assumed that the vehicle B is present at a same position for each type of beam. Thus, using the directional beam Bd makes it possible to communicate with the vehicle B at a location outside of the normal communication area. The directional beam Bd makes it possible to perform data communication with the vehicle B present at a position at which it is impossible to perform data communication using the normal beam Bn. Specifically, in the directivity mode, directivity is controlled to a greater extent than in the normal mode, thereby making it possible to perform data communication with the vehicle B present at the position at which it is impossible to perform data communication in the normal mode.

When the communication unit 100 operates in the directivity mode, the communication control unit 111 controls the directional beam Bd. The control over the directional beam Bd includes beamforming for adjusting the azimuth of the beam axis Bd1 and the beam width Bd2. The communication control unit 111 controls the directivity of the communication unit 100, i.e., the directivity of the beam formed by the antenna of the communication unit 100, through beamforming.

The communication unit 100 broadcasts vehicle-A-position data including, inter alia, current position information and travel-plan information pertaining to the vehicle A. A direct communication scheme is used in the broadcast transmission. The direct communication scheme is, for example, DSRC (frequency: 5.9 GHz band), which is compliant with IEEE 802.11p, or Cellular V2X, which is compliant with specifications in 3GPP Release 14 or later.

The current position information is data correlating a latitude and longitude indicating a current position of the vehicle A and a time at which the position is acquired.

The travel-plan information is travel-plan data including vehicle-speed-plan data correlating a vehicle speed with a future position at which the vehicle A will travel in the future, and future-travel-route data. The future-travel-route data (future-route data) includes information pertaining to a route on which the vehicle A will travel in the future. The future-travel-route data can be route information pertaining to a travel route for traveling to a preset destination or can be data in which an expected passage time is correlated with a future position (latitude and longitude) based on the vehicle-speed-plan data. For example, the travel-plan information is data obtained by adding the vehicle-speed-plan data to data that conforms to a message under SAE J2735 (dedicated short range communications (DSRC) message set dictionary). The term "future" indicates a given point in time that will be reached after a prescribed time from a current time.

An example of the vehicle-A-position data that is broadcasted is shown in table 1. The vehicle-A-position data is package data including a header and content data.

TABLE 1

| | |
|---|---|
| Header | Identification number of vehicle serving as a transmission source. |
| | Identification information indicating the type of content included in the content data (for example, an ID is stored for identification indicating that the content type is current position information, travel-plan information, or a future position) |
| Content Data | Current position information: data correlating the latitude and longitude with the time when the position information is acquired |
| | Travel-plan information: travel-plan data including vehicle-speed-plan data in which a vehicle speed is correlated with a future position of the vehicle, and future-travel-route data |

As shown in table 1, an identification number for the vehicle A serving as a transmission source and identification information indicating a type of content included in the content data (e.g., an ID for identification indicating the current position information, the travel-plan information, and the like) are stored in the header of the vehicle-A-position data. The content data contains the current position information, which is data correlating the time when the position information is acquired with the latitude and longitude, and the travel-plan information.

As well as a function for controlling wireless communication performed by the communication unit 100, the communication control unit 111 assumes a data processing function for performing a variety of processes that are necessary for performing wireless communication. The vehicle-A-position data, which is the package data including the header and the content data, is generated by the communication control unit 111 based on data acquired from the GPS receiver 101 or the like and data that is prerecorded in a memory provided to the controller 110. The vehicle-A- position data is transmitted by the communication unit 100 and received by the communication unit 200 of the vehicle B.

The communication unit 100 receives vehicle-B-position data that is transmitted by the communication unit 200 of the vehicle B and outputs the received vehicle-B-position data to the communication control unit 111. The communication control unit 111 acquires the vehicle-B-position data from the communication unit 100. Receipt of the vehicle-B-position data by the communication unit 100 means that direct communication between the vehicle A and the vehicle B is established.

In a relationship with the present embodiment, based on an amount of transition in frequency due to a Doppler shift that corresponds to the relative speed of the vehicle B to the vehicle A, the communication control unit 111 extracts, from among a plurality of vehicles B, a designated vehicle with which the communication unit 100 will perform data communication. The communication control unit 111 then initiates data communication with the designated vehicle.

A configuration of the vehicle B shall be described next.

As shown in FIG. 1, the vehicle B is provided with the communication unit 200 described above, a GPS receiver 201, a map information acquisition unit 202, and a controller 210. The communication unit 200, the GPS receiver 201, the map information acquisition unit 202, and the controller 210 constitute an information processing device for realizing the vehicle-to-vehicle communication indicated in the present embodiment.

Functions of the GPS receiver 201 and the map information acquisition unit 202 are similar to functions of the GPS receiver 101 and the map information acquisition unit 102. The controller 210 is configured from a microcomputer provided with a hardware processor, a memory, and a variety of interfaces, similarly to the controller 110. The controller 210 is provided with a communication control unit 211 as one example of a plurality of information processing circuits. Functions of the communication control unit 211 are the same as functions of the communication control unit 111 and include a function for controlling wireless communication performed by the communication unit 200 and a data processing function for performing a variety of processes that are necessary for performing wireless communication, such as generating the vehicle-B-position data.

Figure 3:
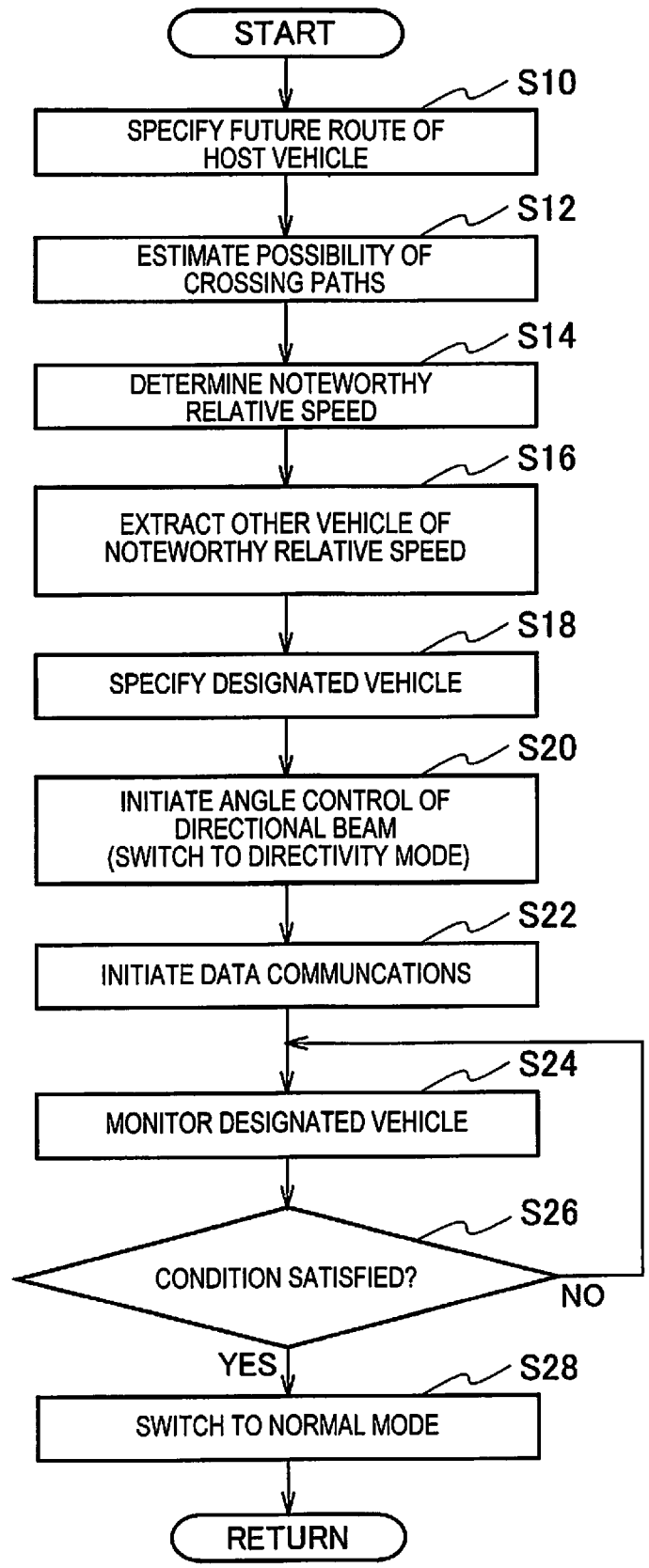
FIG. 3 is a flow chart showing a flow of a process in vehicle-to-vehicle communication on the communication network.
Figure 4:
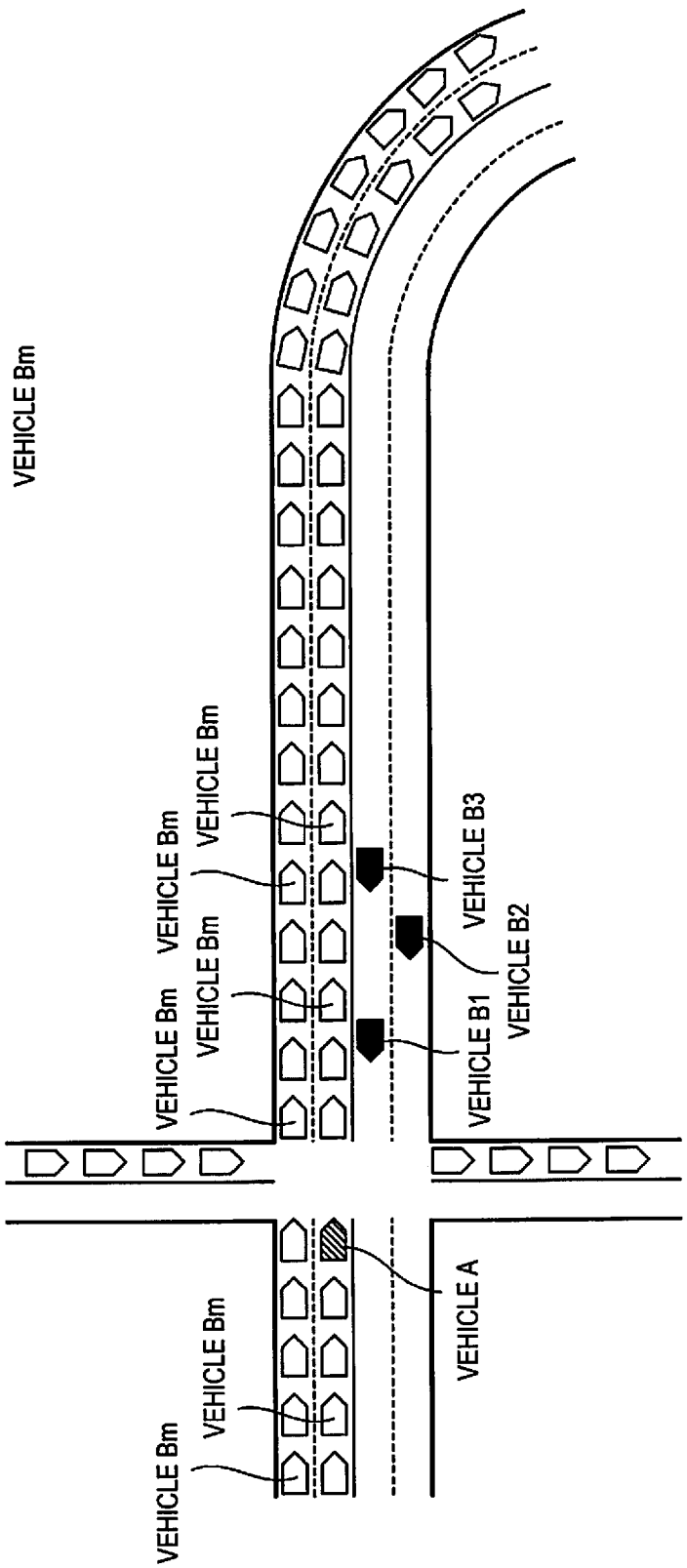
FIG. 4 is a diagram illustrating a travel scenario according to the present embodiment.

The process flow of vehicle-to-vehicle communication in the communication network is described with reference to FIGS. 3 to 7. The process shown in the flow chart of FIG. 3 is executed by the controller 110 of the host vehicle A (corresponding to the vehicle A in FIG. 1). The operating mode of the communication unit 100 is initially set to the normal mode. In the following description, a scenario of traveling through an intersection like that illustrated in FIG. 4 is assumed. Here, the host vehicle A is traveling on a first road that passes through the intersection. The current position of the host vehicle A is a position immediately prior to entering the intersection. The route along which the host vehicle A will travel in the future is a route that involves turning right at the intersection and advancing onto a second road intersecting the first road at the intersection. On the first road, congestion is occurring in the lane in which the host vehicle A is traveling and in the lane adjacent thereto, and a plurality of other vehicles Bm (each corresponding to the other vehicle B in FIG. 1) in a stopped state or traveling at a low speed are present on the first road.

Meanwhile, three other vehicles B1, B2, B3 (each corresponding to the other vehicle B in FIG. 1) are traveling in the oncoming lane of the first road. Congestion has not occurred in the oncoming lane, and the other vehicles B1, B2, B3 can travel in accordance with traffic regulations. The current positions of the other vehicles B1, B2, B3 are positions that are a prescribed distance before the intersection. The future travel routes of each of the other vehicles B1, B2, B3 are routes passing straight through the intersection along the first road.

First, the controller 110 specifies a future travel route on which the host vehicle A will travel in the future (S10). For example, the controller 110 acquires the future-travel-route data included in the vehicle-A-position data and specifies the future travel route from the future-travel-route data.

The controller 110 estimates a possibility that the host vehicle A and another vehicle will cross paths (S12). In a case in which the host vehicle A is to turn right at the intersection, there is a possibility that the host vehicle A will cross the paths of the other vehicles B1, B2, B3 traveling in the oncoming lane. The controller 110 determines whether the host vehicle A will turn right at the intersection based on the future travel route and map information acquired by the map information acquisition unit 102. If the controller 110 has determined that the host vehicle A will turn right at the intersection, the controller 110 determines that there is a possibility of crossing paths. When a possibility of crossing paths exists, the controller 110 performs the following process.

First, the controller 110 determines the relative speed (noteworthy relative speed) of another vehicle requiring attention (S14). By "another vehicle requiring attention" is meant another vehicle, from among the other vehicles present in the area around the host vehicle A, having a high priority level for performing vehicle-to-vehicle communications. When the host vehicle A is to turn right at the intersection, the another vehicle requiring attention is another vehicle for which there is a potential for crossing paths, namely, the other vehicles B1, B2, B3 traveling in the oncoming lane. Therefore, for example, the controller 110 references the map information, identifies the speed limit in the oncoming lane of the first road, and determines a reference speed $\alpha$ that serves as a reference based on the speed limit. For example, the controller 110 determines, as the reference speed $\alpha$, a speed obtained by subtracting a certain speed from the speed limit. The controller 110 assumes that the other vehicles B1, B2, B3 traveling in the oncoming lane are traveling at a speed equal to or greater than the reference speed $\alpha$, and determines a relative speed that becomes $-\alpha$ or less as the noteworthy relative speed.

The controller 110 then extracts, from the plurality of other vehicles with which the communication unit 100 has communicated, the other vehicle of a noteworthy relative speed (S16). Due to a Doppler shift, the frequency of radio waves received by the communication unit 100 from the communication unit 200 of the traveling other vehicle transitions from the frequency of radio waves transmitted by the communication unit 200. The amount of transition of the frequency corresponds to the relative speed of the other vehicle in relation the host vehicle A. For example, if the relative speed of the other vehicle is $-\alpha$ or less, the amount of transition of the frequency becomes $-\beta 2$ or less (see FIG. 7).

The controller 110 maintains a correspondence relationship in which the amount of transition of the frequency is corresponded with the relative speed of the other vehicle, and extracts the other vehicle of a noteworthy relative speed based on the amount of transition of the frequency. For example, the controller 110 extracts another vehicle for which the amount of transition of the frequency becomes −β2 or less. As a consequence thereof, the controller 110 can extract, from among other vehicles present in the area around the host vehicle A, the other vehicles B1, B2, B3 traveling in the oncoming lane. In addition, because the noteworthy relative speed is established based on the speed limit in the oncoming lane, the controller 110 can extract the other vehicle B1, B2, or B3 having a speed value with the greatest impact on the host vehicle A, even among the other vehicles B1, B2, B3 traveling in the oncoming lane.

Next, the controller 110 specifies, as the designated vehicle, the other vehicle with the highest priority order among the extracted other vehicles B1, B2, B3 (S18). Specifically, when the controller 110 has communicated with the other vehicles B1, B2, B3, the controller 110 can receive the current position information of the other vehicles B. Moreover, from the results of communication with the other vehicles B1, B2, B3, or from past and current position information of the other vehicles B1, B2, B3, the controller 110 identifies the current speeds of the other vehicles B1, B2, B3.

Based on the current position and speed of the host vehicle and the current positions and speeds of the other vehicles B1, B2, B3, the controller 110 determines whether the host vehicle A and the other vehicles B1, B2, B3 will cross paths in the future. In FIG. 4, if the speeds of the other vehicles B1, B2, B3 are generally the same, the times at which each of the other vehicles B1, B2, B3 pass through the intersection will be such that the other vehicle B1 closest to the intersection passes through the intersection first, followed by the other vehicle B2, and lastly the other vehicle B3. Accordingly, the controller 110 determines that there is a high possibility that the other vehicle B1 that will pass through the intersection the earliest will cross paths with the host vehicle A. The controller 110 assesses that the other vehicle B1 is the vehicle with the highest priority order, and finalizes the other vehicle B1 as the designated vehicle.

Note that the controller 110 can receive travel-plan data by communicating with the other vehicles B1, B2, B3. Therefore, the controller 110 may identify the future positions of the other vehicles B1, B2, B3 from the vehicle-speed-plan data. Alternatively, the controller 110 may acquire position data of the other vehicles B and identify the future travel routes of the other vehicles B1, B2, B3. The controller 110 may determine a situation of crossing paths from the future positions or future travel routes of the other vehicles B1, B2, B3, and may thereby specify the other vehicle with the highest priority order.

The controller 110 may compositively determine a future crossing of paths by using one of these techniques alone, or by using a combination of these techniques. As a consequence thereof, the controller 110 can specify, as the designated vehicle, the other vehicle B1 with the highest priority order from among the other vehicles B21, B2, B3 traveling in the oncoming lane.

Figure 5:
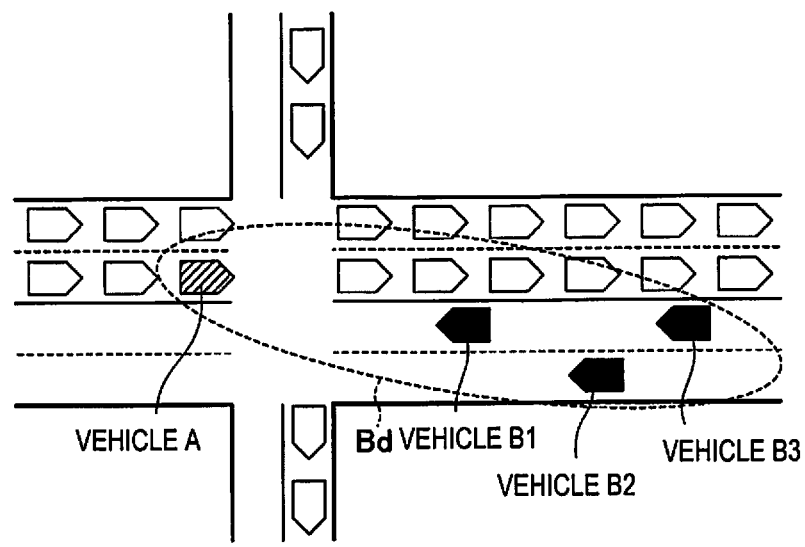
FIG. 5 is a diagram illustrating a designated vehicle and a directional beam.

When specifying the designated vehicle, the controller 110 switches the operating mode of the communication unit 100 from the normal mode to the directivity mode. In addition, the controller 110 initiates angle control of the directional beam Bd (S20). As illustrated in FIG. 5, the controller 110 controls the directional beam Bd such that the directional beam Bd is oriented toward the other vehicle B1, which is the designated vehicle. That is, the controller 110 adjusts the beam axis Bd1 of the directional beam Bd to a prescribed azimuth. The azimuth to which the beam axis Bd1 should be directed is the azimuth when the other vehicle B1 is observed from the host vehicle A and can be calculated based on the current position of the host vehicle A and the current position of the other vehicle B1. The directional beam Bd is adjusted so as to be oriented toward the current position of the other vehicle B1 by controlling the azimuth of the beam axis Bd1.

When the directional beam Bd is oriented toward the other vehicle B1, subsequently, the controller 110 controls the directional beam Bd so as to track the other vehicle B1 that is moving. An example of a method for tracking the other vehicle B1 is a method in which the current position of the other vehicle B1 is continuously identified using data communication with the other vehicle B1, and the azimuth of the directional beam Bd is controlled based on the newest current position. Moreover, the controller 110 may control the azimuth of the directional beam Bd via feedback so as to search for a point at which the reception strength is maximized.

The controller 110 initiates data communication with the other vehicle B1 (S22). As a consequence thereof, the controller 110 can receive necessary information from the other vehicle B1.

The controller 110 monitors the other vehicle B1 (S24). Monitoring of the other vehicle B1 includes monitoring the reception strength and monitoring the current position of the other vehicle B1.

The controller 110 determines whether a condition in which communication with the other vehicle B1 can be carried out even with the normal beam Bn is satisfied. Specifically, if the reception strength has increased to a certain level or if the current position of the other vehicle B1 is present within the area of the normal beam Bn, the controller 110 determines that the condition is satisfied (Yes in S26) and switches the operating mode of the communication unit 100 to the normal mode (S28). If the controller 110 determines that the condition is not satisfied, the controller 110 continues to monitor the other vehicle B1 (S24).

Figure 6:
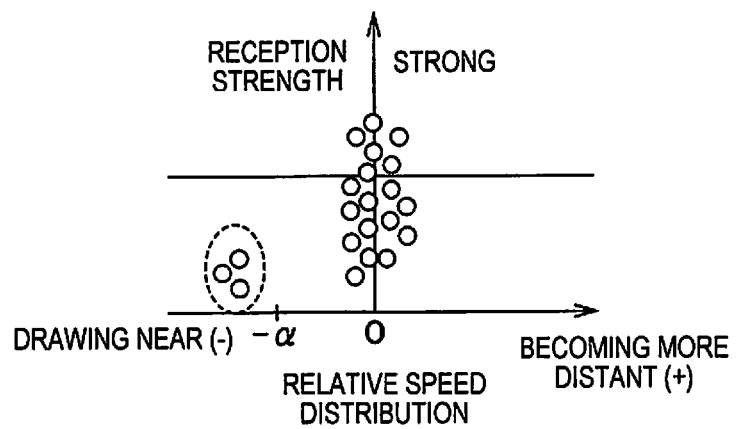
FIG. 6 is a chart showing a relationship between reception strength and relative speed.

Thus, according to the present embodiment, even in an environment in which numerous other vehicles are present in an area surrounding the host vehicle, a designated vehicle with which data communications are to be performed can be suitably extracted. Comparing the reception sensitivity with a threshold value is a typical method for extracting the designated vehicle for performing data communication. According to this method, another vehicle for which the reception sensitivity is equal to or greater than the threshold value is extracted as the designated vehicle. However, the other vehicle traveling in the oncoming lane approaches the host vehicle from afar. As illustrated in FIG. 6, if the other vehicle traveling in the oncoming lane is present at a position far from the host vehicle, the reception sensitivity is lower than the threshold value, and therefore the other vehicle traveling in the oncoming lane cannot be extracted. As shall be apparent, lowering the threshold value is also conceivable, but in an environment in which numerous other vehicles are present in the area around the host vehicle as occurs during congestion, lowering the threshold value results in a significant increase in the number of designated vehicles that are extracted. Therefore, the filtering effect is weak. In addition, even with the other vehicle traveling in the oncoming lane, the other vehicle can be isolated through reception sensitivity if the other vehicle approaches the host vehicle. However, the other vehicle traveling in the oncoming lane must be sufficiently close to the host vehicle, and the presence of the other vehicle traveling in the oncoming lane cannot be recognized at an early stage.

Figure 7:
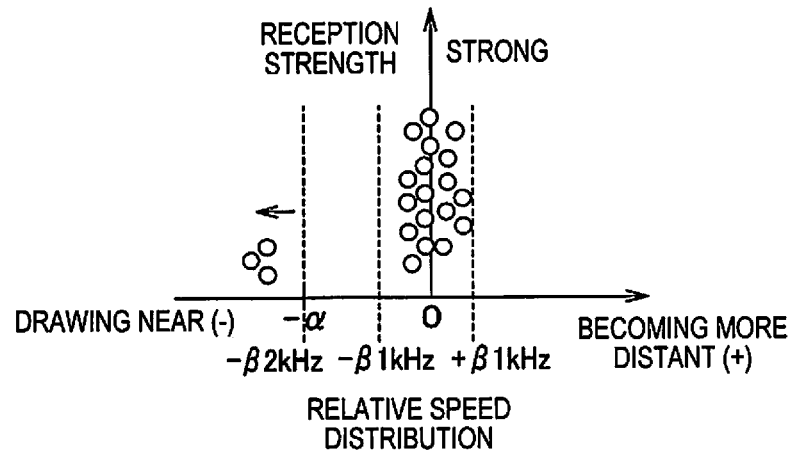
FIG. 7 is a chart showing an amount of transition in frequency according to a relative speed.

Therefore, in the present embodiment, based on the amount of transition of the frequency due to a Doppler shift, the controller 110 of the information processing device extracts, from among the other vehicles, a designated vehicle with which data communications are to be performed. The amount of transition of the frequency due to a Doppler shift is dependent on the relative speed of the other vehicle in relation to the host vehicle. For example, as illustrated in FIG. 4, when congestion is occurring in the lane in which the host vehicle A is traveling and in the lane adjacent thereto, the relative speed of the other vehicles during congestion becomes zero or a value close to zero. As shown in FIG. 7, the amount of transition of the frequency of these other vehicles is in a range of $\pm\beta 1$, whereas the other vehicles traveling in the oncoming lane have a relative speed of $-\alpha$ or lower. Thus, the amount of transition of the frequency becomes $-\beta 2$ or less. Therefore, filtering according to the relative speed can be performed by focusing attention on the amount of transition of the frequency due to a Doppler shift. As a consequence thereof, even when another vehicle traveling in the oncoming lane is traveling at a position far from the host vehicle, the other vehicle traveling in the oncoming lane can be extracted at an early stage. As a consequence thereof, necessary information can be suitably accepted, and therefore the presence of the other vehicle traveling in the oncoming lane can be recognized at an early stage. In addition, when a necessary process such as an authentication process is to be performed through vehicle-to-vehicle communications, the number of other vehicles that can perform communications may be constrained to an upper limit value or less. However, even in such a case, the designated vehicles that perform data communication can be restricted by performing filtering according to the relative speed. As a consequence thereof, a necessary constraint for communications can be achieved.

In the present embodiment, the controller 110 of the information processing device controls the directivity of the communication unit 100 such that the directivity is oriented toward the designated vehicle. As a consequence thereof, communications can be performed with the area being limited, and therefore data communications can be reliably performed with the designated vehicle. As a result, necessary information can be suitably accepted.

In the present embodiment, another vehicle having a route of travel along a road connecting with an intersection of a road on which the host vehicle is traveling, specifically, another vehicle traveling in the oncoming lane, was exemplified as the designated vehicle. The relative speed of this other vehicle in the oncoming lane becomes a speed ($\leq -\alpha$) that is large on the negative side. Therefore, the other vehicle in the oncoming lane can be isolated from a different other vehicle by using the relative speed.

In the present embodiment, the controller 110 of the information processing device can specify the designated vehicle based on priority order using the relative speed. Moreover, among other vehicles present in the area around the host vehicle, the priority order of other vehicles traveling in the oncoming lane is the highest, and in the present embodiment, even among the other vehicles traveling in the oncoming lane, the priority order of another vehicle having the potential to cross paths with the host vehicle is increased. As a consequence thereof, the other vehicle requiring attention by the host vehicle can be preferentially specified as the designated vehicle. As a result, necessary information can be suitably accepted.

The relative speed of the other vehicle traveling at a certain speed or higher in the oncoming lane becomes a negative value, and the absolute value of the relative speed is increased. Therefore, the other vehicle traveling in the oncoming lane at a certain speed or higher can be isolated from different other vehicles by using a prescribed determined value ($-\alpha$), which is a negative value. As a consequence thereof, the other vehicle traveling at a certain speed or higher in the oncoming lane can be extracted, and therefore data communication can be suitably performed with a necessary counterpart.

In the present embodiment, the communication unit 100 forms a beam having directivity, and thereby the directivity of the communication unit 100 can be adjusted. As a consequence thereof, the directivity of the communication unit 100 can be suitably controlled.

In the present embodiment, after extracting the designated vehicle, the controller 110 of the information processing device switches the communication unit 100 from the normal mode to the directivity mode, and then initiates data communication with a designated vehicle.

Directivity of the communication unit 100 can be controlled by switching the operating mode of the communication unit 100 to the directivity mode. By performing communications with directivity, a communication counterpart can be selected even in situations in which numerous other vehicles are present in the area around the host vehicle.

In the present embodiment, the controller 110 communicates with the other vehicles with the communication unit 100 operating in normal mode and extracts the designated vehicle based on the communication results thereof. However, the controller 110 may also extract the designated vehicle by switching the communication unit 100 to the directivity mode and scanning a necessary range with the directional beam Bd.

In the present embodiment, when specifying the designated vehicle, the controller 110 controls the directional beam Bd so as to be oriented toward the designated vehicle. However, the goal of communication with the designated vehicle performed by the host vehicle is to acquire information pertaining to the designated vehicle that will cross the path of the host vehicle. Even if the directional beam Bd is formed, vehicle-to-vehicle communication with the designated vehicle might be impossible due to a communication environment in which an obstruction is present between the host vehicle and the designated vehicle.

Figure 8:
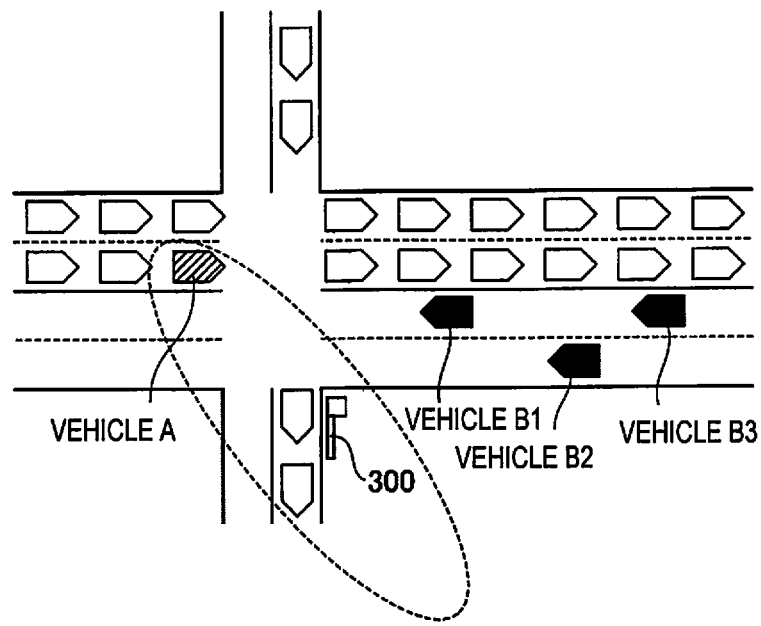
FIG. 8 is an explanatory diagram illustrating a roadside unit and a directional beam.

As shown in FIG. 8, the roadside unit 300 for distributing information pertaining to the vehicles can be present on the road on which the host vehicle is traveling. Accordingly, when the roadside unit 300 for transmitting distribution data including information pertaining to the designated vehicle is present, the controller 110 can control the directional beam Bd so as to be oriented toward the roadside unit 300. For example, when extracting the designated vehicle, the controller 110 analyzes distribution data in a case in which communication with the roadside unit 300 has been achieved. The controller 110 can determine whether the roadside unit 300 is one that transmits distribution data including information of the designated vehicle. The controller 110 can also acquire, from the distribution data, position information on the roadside unit 300 to which the directional beam Bd should be oriented.

Thus, the controller 110 may control the directivity of the communication unit 100 so as to be directed toward the roadside unit 300 that transmits distribution data including information pertaining to the designated vehicle. As a consequence thereof, the controller 110 can reliably communicate data with the roadside unit 300, and therefore can suitably accept information regarding the designated vehicle. That is, the controller 110 may regard the roadside unit 300, which transmits distribution data including information on the designated vehicle, as the designated vehicle instead of the designated vehicle itself.

Moreover, according to an information processing method disclosed in the present embodiment, similar to the information processing device, filtering according to the relative speed can be performed by focusing attention on the amount of transition of the frequency due to a Doppler shift. As a consequence thereof, even when another vehicle traveling in the oncoming lane is traveling at a position far from the host vehicle, the other vehicle traveling in the oncoming lane can be extracted at an early stage, and therefore necessary information can be suitably accepted. As a result, the presence of the other vehicle traveling in the oncoming lane can be recognized at an early stage.

In the embodiment described above, a scenario of a host vehicle traveling through an intersection was exemplified as a situation with a potential for crossing paths. In this case, another vehicle having a route of travel along a road (e.g., an intersecting road) connecting with the intersection may be extracted as the designated vehicle in addition to the other vehicle traveling in the oncoming lane.

Figure 9:
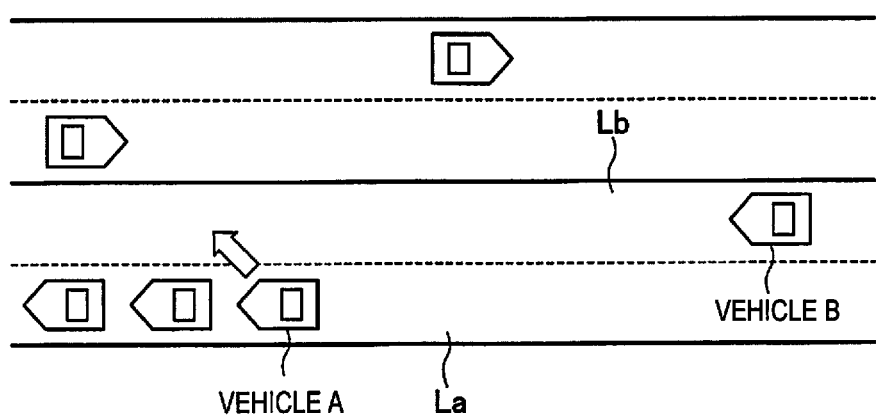
FIG. 9 is a diagram explaining a travel scenario to which the present embodiment can be applied.

Moreover, in addition to the scenario in which the host vehicle is traveling through an intersection, a situation requiring attention may also be a scenario in which another vehicle that could affect the future travel of the host vehicle is present, such as a scenario in which the host vehicle and the other vehicle cross paths. For example, as illustrated in FIG. 9, the scenario may be one in which the host vehicle A traveling in a travel lane La changes lanes to an overtaking lane Lb and performs an overtaking maneuver. Here, another vehicle B traveling in the overtaking lane Lb and approaching the host vehicle A at a high speed from behind has the potential to cross paths with the host vehicle A, and therefore it is highly likely that the other vehicle B could impact the future travel of the host vehicle A. Accordingly, even in this scenario of a lane change, the other vehicle B having a route of travel in the overtaking lane Lb can be specified as the designated vehicle by using filtering according to relative speed. As a consequence thereof, information on the other vehicle B, which could impact the future travel of the host vehicle A, can be suitably ascertained.

Moreover, in this scenario of performing an overtaking maneuver, if the controller 110 has assessed that the host vehicle is performing an overtaking maneuver, the controller 110 preferably performs a process of specifying a designated vehicle. For example, if the controller 110 has detected an operation signal allowing overtaking by an occupant, the controller 110 assesses that that host vehicle is performing an overtaking maneuver. Alternatively, the controller 110 may autonomously assess that the host vehicle will perform an overtaking maneuver on the condition that an obstacle is present in front of the host vehicle in the travel lane or a preceding vehicle traveling at a slower speed than the host vehicle is present in the travel lane. Thus, a designated vehicle can be specified at a suitable timing by assessing an overtaking maneuver by the host vehicle and performing the process of specifying a designated vehicle.

In addition to a scenario in which overtaking is performed using the overtaking lane, the overtaking scenario may be a situation in which overtaking is performed using the oncoming lane. In this case, speed filtering according to relative speed may be performed such that another vehicle having a route of travel in the oncoming lane is extracted as the designated vehicle.

In addition, the technique of the present embodiment may be applied to a scenario in which the host vehicle travels while tracking another vehicle traveling in the same lane in front of the host vehicle. In this case, speed filtering may be performed so as to exclude the other vehicle traveling in the oncoming lane from the designated vehicles.

In the present embodiment, an example is given in which a plurality of information processing circuits provided to controllers 110, 210 are realized using software. However, as shall be apparent, it is also possible to configure the information processing circuits by preparing dedicated hardware for processing various information. It is also possible for the plurality of information processing circuits to be configured from individual items of hardware.

Although an embodiment of the present invention is disclosed as described above, statements and drawings that form parts of this disclosure is not to be construed to limit the present invention. A variety of alternative embodiments, examples, and techniques for implementation will be apparent to persons skilled in the art from this disclosure.

The invention claimed is:

1. An information processing device comprising:
   a communication unit configured to be mounted on a first moving body and to perform data communication with a plurality second moving bodies present around the first moving body; and
   a controller controlling data communication performed by the communication unit,
   the communication unit including operating modes configured to be switched between a directivity mode in which directivity of wireless communication can be controlled and a normal mode in which the wireless communication in a preset area is performed without controlling the directivity of the wireless communication,
   the controller being configured to
   extract a designated moving body from among the second moving bodies with which the communication unit performs the data communication while in a state where the communication unit is operated in the normal mode based on an amount of transition in frequency due to a Doppler shift corresponding to a relative speed of each of the second moving bodies in relation to the first moving body, and
   initiate the data communication with the designated moving body after the communication unit has been switched from the normal mode to the directivity mode.

2. The information processing device according to claim 1, wherein
   the controller is configured to control the directivity of the wireless communication performed by the communication unit so as to be oriented toward the designated moving body.

3. The information processing device according to claim 2, wherein
   the communication unit is configured to adjust the directivity of the wireless communication performed by the communication unit by forming a beam having directivity, and
   the controller is configured to control the directivity of the beam formed by the communication unit.

4. The information processing device according to claim 1, wherein
   the designated moving body is
   the second moving body having a route of travel on an oncoming lane of a road on which the first moving body travels,
   the second moving body having a route of travel on an overtaking lane of the road on which the first moving body travels, or the second moving body having a route of travel along a road connecting with an intersection included in a route of future travel of the first moving body.

5. The information processing device according to claim 1, wherein
the controller is configured to determine a priority order for the second moving bodies based on current position information and speed information for the second moving bodies and current position information and speed information for the first moving body, and extract the designated moving body based on the priority order.

6. The information processing device according to claim 1, wherein
the controller is configured to extract the second moving body as the designated moving body for which a relative speed of the second moving body in relation to the first moving body is smaller than a prescribed determined value, which is a negative value.

7. The information processing device according to claim 1, wherein
the controller is configured
determine whether the first moving body is performing an overtaking maneuver, and perform a process of extracting the designated moving body upon determining that the first moving body is performing the overtaking maneuver.

8. An information processing method for an information processing device comprising a communication unit configured to be mounted on a first moving body and performs data communication with a plurality second moving bodies present around the first moving body, and a controller configured to control the data communication performed by the communication unit,
the information processing method comprising:
extracting a designated moving body from among the second moving bodies with which the communication unit performs the data communication while in a state where the communication unit is operated in the normal mode based on an amount of transition in frequency due to a Doppler shift corresponding to a relative speed of each of the second moving bodies in relation to the first moving body, and
initiating the data communication with the designated moving body after the communication unit has been switched from the normal mode to the directivity mode.

* * * * *